United States Patent
Loth et al.

(10) Patent No.: US 6,828,382 B1
(45) Date of Patent: Dec. 7, 2004

(54) POLYACRYLATE JOINT SEALANTS

(75) Inventors: Helmut Loth, Essen (DE); Klaus Helpenstein, Moenchengladbach (DE); Wolfgang Klauck, Meerbusch (DE); Johann Klein, Duesseldodrf (DE); Lydia Duhm, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/530,815

(22) PCT Filed: Oct. 31, 1998

(86) PCT No.: PCT/EP98/06907

§ 371 (c)(1),
(2), (4) Date: Jul. 12, 2000

(87) PCT Pub. No.: WO99/24522

PCT Pub. Date: May 20, 1999

(30) Foreign Application Priority Data

Nov. 7, 1997 (DE) .......................... 197 49 101

(51) Int. Cl.$^7$ ............................................. C08K 5/1515
(52) U.S. Cl. .................... 525/114; 156/330.9; 524/317; 524/394; 524/560; 524/565; 524/566
(58) Field of Search ....................... 156/330.9; 524/317, 524/566, 114, 394, 560, 565

(56) References Cited

U.S. PATENT DOCUMENTS

| 2,442,588 A | * | 6/1948 | D'Alelio ...................... 526/195 |
| 3,486,930 A | * | 12/1969 | Antifinger et al. .......... 523/206 |
| 3,551,374 A | * | 12/1970 | Reinhard et al. ............ 524/513 |
| 3,706,589 A | * | 12/1972 | Fukuda et al. ............... 427/154 |
| 3,736,287 A | * | 5/1973 | Patella ........................ 524/833 |
| 3,738,991 A | * | 6/1973 | Reed ........................... 523/410 |
| 3,749,690 A | * | 7/1973 | Patella ........................ 524/555 |
| 3,786,020 A | * | 1/1974 | Emmons ...................... 524/532 |
| 3,919,146 A | * | 11/1975 | Emmons .................... 525/301.5 |
| 4,240,938 A | * | 12/1980 | Kraft et al. .................. 428/414 |
| 5,075,348 A | | 12/1991 | Revis et al. ................... 522/84 |
| 5,087,664 A | * | 2/1992 | Sugino et al. ............... 524/507 |
| 5,164,277 A | | 11/1992 | Hirai et al. .................. 430/138 |
| 5,271,968 A | | 12/1993 | Coyle et al. ................. 427/558 |
| 5,356,754 A | | 10/1994 | Kushi et al. ................. 430/288 |
| 6,087,436 A | * | 7/2000 | Larrow et al. ............ 427/388.5 |

FOREIGN PATENT DOCUMENTS

| EP | 0038295 | 10/1981 |
| EP | 0062807 | 10/1982 |
| JP | 359137347 A | * 8/1984 |
| WO | WO9217337 | 10/1992 |
| WO | WO9517437 | 6/1995 |
| WO | WO9707173 | 2/1997 |
| WO | WO9606897 | 3/1997 |

OTHER PUBLICATIONS

Dimer Acids and their Derivatives–Potential Applications.
ISO 11600.
DIN EN 27 390.
DIN EN 28 339.
DIN EN 29 048.
DIN EN 27 389.

* cited by examiner

Primary Examiner—Judy M. Reddick
(74) Attorney, Agent, or Firm—Stephen D. Harper; Daniel S. Ortiz; Glenn E. J. Murphy

(57) ABSTRACT

This invention relates to a jointing compound of an acrylate/acrylonitrile copolymer containing 2 to 8 carbon atoms in the alcohol component as binder and fatty compounds as plasticizer and also fillers and auxiliaries. Epoxystearic acid methyl ester in particular may be used as the fatty compound while a butyl acrylate/acrylonitrile copolymer in particular may be used as the acrylate/acrylonitrile copolymer. The combination of the two substances results in jointing compounds characterized by a dramatic improvement in elasticity (resilience). Accordingly, they are particularly suitable for substrates with different coefficients of thermal expansion.

20 Claims, No Drawings

POLYACRYLATE JOINT SEALANTS

FIELD OF THE INVENTION

This invention relates to a polyacrylate jointing compound based on a polyacrylate as binder, a fatty compound as plasticizer and typical fillers and auxiliaries.

BACKGROUND OF THE INVENTION

Polyacrylate jointing compounds are known. Thus, WO 97/07173 describes a jointing compound of a butyl acrylate/styrene copolymer, epoxystearic acid methyl ester, chalk, $TiO_2$, ammonia, wetting agent and water (see page 26). This known jointing compound has a resilience of 22% when the test specimen is elongated by 100% and allowed to relax for 1 hour after 24 hours at room temperature. The E 100 modulus (=offset yield stress at 100% elongation) is 0.04 for concrete, 0.05 for wood, 0.015 for PVC and 0.06 $N/mm^2$ for aluminium.

WO 96/06897 describes a composition of a homopolybutyl acrylate and an epoxystearic acid methyl ester (see page 21, Example 4). Compositions of this type are particularly suitable for the production of paste-form sealants, such as jointing compounds (see page 13, last paragraph).

Although compositions of the type in question may be used as a jointing compound with a low requirement profile, they cannot be regarded as elastic jointing compounds. To this end, they have to meet the following requirement: their resilience must be >70%, corresponding to IVD-Merkblatt No. 2. Resilience is measured in accordance with ISO 7389, Method B.

SUMMARY OF THE INVENTION

The problem addressed by the present invention was to provide high-quality jointing compounds which would be distinguished not only by high elasticity, but also by universal adhesion without primers to the substrates typically encountered in the building industry. The jointing compound according to the invention would by definition be UV- and weather-resistant for outdoor use.

The solution provided by the invention is defined in the claims and essentially consists of a paste-form compound which contains the following components:

A) 10 to 60% by weight of an acrylate/acrylonitrile copolymer containing 2 to 8 carbon atoms in the alcohol component as binder,
B) 0.2 to 15% by weight of fatty compounds as plasticizer,
C) 0 to 70% by weight of fillers and pigments,
D) 0.3 to 5% by weight of auxiliaries and
E) 5 to 20% by weight of water.

DETAILED DESCRIPTION OF THE INVENTION

The jointing compound is paste-like when the extrusion rate is at most 4,000 g/min. to 6,000 g/min. and preferably between 500 g/min. and 400 g/min. The measuring temperature is 23° C. The measurement is carried out by the method defined in ISO 9048.

In the context of the invention, "acrylate/acrylonitrile copolymers" are understood to be copolymers which contain at least one acrylate and acrylonitrile as comonomers. The percentage acrylonitrile content is in the range from 2 to 10% by weight and, more particularly, in the range from 4 to 8% by weight. The percentage acrylate content is in the range from 85 to 98% by weight and, more particularly, in the range from 90 to 98% by weight. The individual comonomers are preferably distributed blockwise in the main chain. The preferred acrylate is butyl acrylate. Instead of butyl acrylate, however, other esters of acrylic acid may be used providing their alcohol component contains 2 to 8 and preferably 2 to 4 carbon atoms.

The acrylate/acrylonitrile copolymer may contain other comonomers in small quantities in order to obtain special effects. Comonomers suitable for improving adhesion are, for example, olefinically unsaturated hydrolyzable silicon compounds such as, for example, vinyl trialkoxysilane, the alkoxy group being selected from methoxy, ethoxy, methoxyethylene, ethoxyethylene, methoxypropylene glycol ether or ethoxypropylene glycol ether groups. Regulators may optionally be used to control the yield point. Examples of suitable regulators are water-soluble monomers, such as acrylic acid, methacrylic acid, acrylamide, methacrylamide, N-methylol acrylamide or methacrylamide.

The dispersions should not contain any monomers which are capable of inducing chemical crosslinking either in the dispersion itself or by addition of other auxiliaries such as, for example, a combination for copolymerized carboxyl groups with a water-soluble zinc tetramine complex or a copolymerized hydrolyzable monomer, such as glycidyl acrylate or methacrylate.

Suitable acrylate/acrylonitrile copolymers are preferably produced by emulsion polymerization.

"Fatty compounds" in the context of the invention include fatty acids, fatty alcohols and derivatives thereof. Their molecular weight is generally above 100 and, more particularly, above 200. The upper limit is 20,000 and preferably between 300 and 1,500.

"Fatty acids" in the context of the invention are understood to be acids which contain one or more carboxyl groups (—COOH). The carboxyl groups may be attached to saturated, unsaturated, unbranched or branched alkyl groups containing more than 8 and, in particular, more than 12 carbon atoms. Besides the —OH, —SH, —C=C—, —COOH, amino, anhydride or epoxide groups mentioned above, they may contain other groups, such as ether, ester, halogen, amide, amino, urethane and urea groups. However, carboxylic acids, such as native fatty acids or fatty acid mixtures, dimer fatty acids and trimer fatty acids, are preferred. Specific examples of the fatty acids besides the saturated fatty acids are, in particular, the monounsaturated or polyunsaturated acids palmitoleic acid, oleic acid, elaidic acid, petroselic acid, erucic acid, ricinoleic acid, hydroxymethoxystearic acid, 12-hydroxystearic acid, linoleic acid, linolenic acid and gadoleic acid.

Other suitable fatty acids are products resulting from the "guerbetization" and subsequent oxidation of linear saturated or unsaturated fatty alcohols. Examples include 2-ethyl hexanoic acid, 2-butyl octanoic acid, 2-hexyl decanoic acid, 2-decyl tetradecanoic acid, 2-tetradecyl octadecanoic acid, 2-hexadecyl-$C_{20}$ acid or mixtures thereof.

Another suitable fatty acid is isostearic acid as a secondary product of the dimerization of fatty acids.

Polyhydroxyfatty acids may also be used in addition to the naturally occurring fatty acids. They may be obtained, for example, by epoxidation of unsaturated fats and oils or esters of fatty acids with alcohols, ring opening with H-active compounds, for example alcohols, amines and carboxylic acids, and subsequent saponification. The fats and oils required as starting material may be both of vegetable origin and of animal origin or may optionally be synthesized by petrochemical methods.

The fatty acids may also be derived from oil- and fat-based raw materials obtainable, for example, by ene reactions, Diels-Alder reactions, transesterification reactions, condensation reactions, grafting reactions (for example with maleic anhydride or acrylic acid etc.) and epoxidation reactions. Examples of such raw materials are a) epoxides of unsaturated fatty acids, such as palmitoleic acid, oleic acid, elaidic acid, petroselic acid, erucic acid, linoleic acid, linolenic acid, gadoleic acid, b) reaction products of unsaturated fatty acids with maleic acid, maleic anhydride, methacrylic acid or acrylic acid, c) condensation products of hydroxycarboxylic acids, such as ricinoleic acid or 12-hydroxystearic acid, and polyhydroxycarboxylic acids.

Not all the fatty acids described above are stable at room temperature. If necessary, therefore, derivatives of the above-mentioned fatty acids, such as esters or amides, may be used in accordance with the invention.

A preferred embodiment of the invention is characterized by the use of esters or partial esters of the above-mentioned fatty acids with monohydric or polyhydric alcohols. "Alcohols" in the context of the invention are understood to be hydroxyl derivatives of aliphatic and alicyclic saturated, unsaturated, unbranched or branched hydrocarbons. Besides monohydric alcohols, these alcohols also include the low molecular weight hydroxyl-containing chain extending or crosslinking agents known per se from polyurethane chemistry. Specific examples from the low molecular weight range are methanol, ethanol, propanol, butanol, pentanol, decanol, octadecanol, 2ethylhexanol, 2canol, ethylene glycol, propylene glycol, trimethylene glycol, tetramethylene glycol, 2,3-butylene glycol, hexamethylene diol, octamethylene diol, neopentyl glycol, 1,4-bis-hydroxymethyl cyclohexane, Guerbet alcohol, 2-methylpropane-1,3-diol, hexane-1,2,6-triol, glycerol, trimethylol propane, trimethylol ethane, pentaerythritol, sorbitol, formitol, methyl glycoside, butylene glycol, dimer and trimer fatty acids reduced to alcohols. Alcohols derived from rosins, such as abietyl alcohol, may also be used for the esterification reaction.

The alcohols may even be replaced by OH-containing tertiary amines, polyglycerol or partly hydrolyzed polyvinyl esters.

In addition, polycarboxylic acids or hydroxycarboxylic acids may be added for the oligomerization reaction. Examples of such acids are oxalic acid, malonic acid, succinic acid, maleic acid, fumaric acid, glutaric acid, adipic acid, suberic acid, sebacic acid, 1,11-undecanedioic acid, 1,12-dodecanedioic acid, phthalic acid, isophthalic acid, terephthalic acid, hexahydrophthalic acid, tetrahydrophthalic acid or dimer fatty acid, trimer fatty acid, citric acid, lactic acid, tartaric acid, ricinoleic acid, 12-hydroxystearic acid. Adipic acid is preferably used.

Besides the partly saponified fats, such as glycerol monostearate, examples of suitable esters are—preferably—the natural fats and oils of new and old rape, sunflowers, soya, flax, castor beans, coconuts, oil palms, oil palm kernels and olive trees and methyl esters thereof. Preferred fats and oils are, for example, beef tallow with a chain distribution of 67% oleic acid, 2% stearic acid, 1% heptadecanoic acid, 10% saturated $C_{12}$–$C_{16}$ acids, 12% linoleic acid and 2% saturated acids containing less than 18 carbon atoms or, for example, the oil of new sunflowers (NSf) with a composition of about 80% oleic acid, 5% stearic acid, 8% linoleic acid and about 7% palmitic acid. The corresponding epoxides and reaction products with maleic anhydride, for example, may of course also be used. Other examples are partly and completely dehydrated castor oil, partly acetylated castor oil, ring opening products of epoxidized soybean oil with dimer fatty acid.

Fatty acid esters and derivatives thereof obtainable by epoxidation may also be used. Examples of such esters include soya fatty acid methyl ester, linseed oil fatty acid methyl ester, ricinoleic acid methyl ester, epoxystearic acid methyl ester, epoxystearic acid-2-ethylhexyl ester. Preferred glycerides are the triglycerides, for example rapeseed oil, linseed oil, soybean oil, castor oil, partly and completely dehydrated castor oils, partly acetylated castor oil, soybean oil epoxide, linseed oil epoxide, rapeseed oil epoxide, epoxidized sunflower oil.

Epoxidized triglycerides of unsaturated fatty acids ring-opened with nucleophiles are preferably used. Nucleophiles are understood to be such alcohols as, for example, methanol, ethanol, ethylene glycol, glycerol or trimethylol propane; amines such as, for example, ethanolamine, diethanolamine, triethanolamine, ethylenediamine or hexamethylenediamine; or carboxylic acids such as, for example, acetic acid, dimer fatty acid, maleic acid, phthalic acid or a mixture of $C_{6-36}$ fatty acids.

The fats and oils (triglycerides) may be used both in native form and after thermal and/or oxidative treatment or in the form of the derivatives obtainable by epoxidation or by the addition of maleic anhydride or acrylic acid. Specific examples are palm oil, peanut oil, rapeseed oil, cottonseed oil, soybean oil, castor oil, partly and completely dehydrated castor oil, partly acetylated castor oils, sunflower oil, linseed oil, stand oils, blown oils, epoxidized soybean oil, epoxidized linseed oil, rapeseed oil, coconut oil, palm kernel oil and tallows.

Other suitable derivatives are amides of the above-mentioned fatty acids. They may be obtained by reaction with primary and secondary amines or polyamines, for example with monoethanolamine, diethanolamine, ethylenediamine, hexamethylenediamine, ammonia.

"Fatty alcohols" in the context of the invention are understood to be compounds which contain one or more hydroxyl groups. The hydroxyl groups may be attached to saturated, unsaturated, unbranched or branched alkyl groups containing more than 8 carbon atoms and, in particular, more than 12 carbon atoms. Besides the —SH, —C═C—, —COOH, amino, anhydride or epoxy groups required for the subsequent reaction with the alkylene oxides, they may contain other groups, for example ether, ester, halogen, amide, amino, urea and urethane groups. Specific examples of the fatty alcohols according to the invention are ricinoleyl alcohol, 12-hydroxystearyl alcohol, oleyl alcohol, erucyl alcohol, linoleyl alcohol, linolenyl alcohol, arachidyl alcohol, gadoleyl alcohol, erucyl alcohol, brassidyl alcohol, dimer diol (=hydrogenation product of dimer fatty acid methyl ester).

Branched alcohols, so-called Guerbet alcohols, emanating from the condensation of linear, saturated or unsaturated alcohols may also be used. Examples of such alcohols are 2-ethylhexanol, 2-butyloctanol, 2-hexyldecanol, 2-tetradecyl octadecanol, 2-hexadecyl $C_{20}$ alcohol and also isostearyl alcohol and the mixtures resulting from the guerbetization of technical alcohols.

Symmetrical and non-symmetrical ethers and esters with mono- or polycarboxylic acids may be used as derivatives of the fatty alcohols. Monocarboxylic acids are understood to include formic acid, acetic acid, propionic acid, butyric acid, valeric acid, caproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid, behenic acid, lignoceric acid, cerotic acid and melissic acid. Examples of polycarboxylic acids are oxalic acid, adipic acid, maleic acid, tartaric acid and citric acid. At the same time, the fatty acids described above, such as oleic acid oleyl ester for example, may also be used as the carboxylic acid.

The fatty alcohols may even be etherified, especially with polyhydric alcohols, for example alkyl polyglycosides, dimer diol ether.

Fatty acid esters, especially epoxystearic acid methyl ester, are particularly preferred.

In a preferred embodiment, fatty compounds only are used as plasticizers. In particular, no polyalkylene oxides and/or oleochemical derivatives thereof are used.

Fillers are used on the one hand to save binder costs and, on the other hand, to improve handling behavior. The surface tack, volume contraction and adhesion of the jointing compounds and also the mechanical behavior of the hardened compound can be positively influenced by the skilled choice of a filler or filler mixture. Examples of fillers or pigments are chalk, heavy spar, kaolin, carbon black, gypsum, AEROSIL silica, silica gel, kaolins, talcum, graphite, metal oxides of aluminium, iron, zinc, titanium, chromium, cobalt, nickel, manganese etc., optionally as mixed oxides, chromates, molybdates, carbonates, silicates, aluminates, sulfates, native fibers, cellulose, wood chips, phthalocyanines and silica flour. Preferred fillers or pigments are calcium carbonate, barium sulfate and titanium dioxide.

The auxiliaries are used to obtain special effects, depending on the particular application. They include, for example, antioxidants, wetting aids and fungicides such as, for example, isothiazolinone derivatives, preservatives, defoamers, film formers, odor enhancers, water, coupling agents, solvents, dyes, flameproofing agents, flow control agents, resins, tackifiers, viscosity regulators, dispersion aids (for example Na or ammonium salt of polyacrylic acid), emulsifiers (for example alkyl ether phosphates and sulfosuccinates) and thickeners (for example MC, HEG).

Suitable viscosity regulators are, for example, cellulose ethers, hydrogenated castor oil and high disperse silicas and also ionic and nonionic thickeners, such as polyacrylic acid for example, and associative thickeners.

The water may be added together with other components, for example in the form of an aqueous dispersion of the binder or on its own.

The jointing compound according to the invention is preferably made up as follows of the above-mentioned components:

A) 15 to 60% by weight of acrylate/acrylonitrile copolymers containing 2 to 8 carbon atoms in the alcohol component as binder,
B) 1 to 10% by weight of fatty compounds as plasticizer,
C) 20 to 60% by weight of fillers and pigments,
D) 1 to 2.5% by weight of auxiliaries and
E) 10 to 15% by weight of water.

The percentages by weight are based on the final jointing compound.

The jointing compound according to the invention is generally produced from the starting components as follows: the plasticizer according to the invention may be added to the binder after, during or before the polymerization reaction. The formulations are generally produced by initially introducing the binder or binder dispersion and then adding the other components with stirring (optionally at elevated temperature). Finally, the required viscosity is established by adding water.

After application, the paste-like compound obtained dries to form an elastic sealant.

The jointing compounds according to the invention are distinguished by excellent mechanical properties, such as elongation, total deformation, offset yield stress at 100% elongation and, above all, elasticity. Elongation is determined in accordance with ISO 8339, the offset yield stress at 100% elongation in accordance with ISO 8339 and elasticity in accordance with ISO 7389, method B.

An addition of only 0.2% by weight of fatty compound is sufficient to increase elasticity to 37%, an addition of 1% by weight increases it to 80% and, finally, an addition of 4% by weight increases it to 92%, i.e. the elasticity of the jointing compound increases dramatically from 0.2 to 1.0% by weight in a non-linear relation and, thereafter, only increases slowly as more of th plasticizer according to the invention is added.

As expected, the elasticity modulus decreases with the quantity of plasticizer added from 0.17 N/mm$^2$ for a 0% addition of plasticizer to 0.13 N/mm$^2$ for a 2% by weight addition of the plasticizer according to the invention and to 0.11 N/mm$^2$ for a 4% by weight addition of the plasticizer according to the invention. Accordingly, the modulus is reduced substantially linearly.

Accordingly, it is possible through the binder/plasticizer combination according to the invention to obtain high-quality jointing compounds from inexpensive starting materials. Other advantages include universal adhesion without primers, weather resistance and ageing resistance.

The invention is illustrated by the following Examples.

EXAMPLE 1

A) Starting Materials a) 30% by weight of butyl acrylate/acrylonitrile copolymer containing ca. 6% of acrylonitrile (PRIMAL 3362; 62% aqueous dispersion), b) 0 to 4% by weight of epoxystearic acid methyl ester, c) 60% by weight of pigments/fillers, namely $TiO_2$, chalk and polyiso-butylene, d) 1 to 1.5% by weight of dispersants and stabilizers, e) 1 to 1.5% by weight of thickeners, namely cellulose ethers and ammonium salts of polyacrylic acid, f) rest water.

B) Production of the Jointing Compounds

The binder, auxiliaries and plasticizer are initially introduced and homogenized. The fillers are added to the resulting mixture. The individual raw materials are intensively mixed for 45 minutes in a planetary mixer, evacuated and packed in commercially available plastic cartridges. After storage in the cartridges, the jointing compound is performance-tested.

C) Testing of the Jointing Compounds

The jointing compounds were tested in accordance with the relevant standards for jointing compounds (see ISO 11600). The following standards were used for this purpose:

| | |
|---|---|
| stability: | ISO 7390 |
| processability: | ISO 9048 |
| adhesion/elongation behavior: | ISO 8339 |
| resilience: | ISO 7389 |

D) Results

Table 1 below compares increasing plasticizer concentrations with resilience. The test elongation was 100%. All comparison samples containing ACRONAL 3496 X, a styrene/butyl acrylate copolymer containing ca. 29% of styrene, ca. 60% of butyl acrylate and ca. 5% of acrylic acid, showed adhesion and cohesion cracks both during measurement and during subsequent storage, so that resilience cannot be determined. The values for the preparation produced in accordance with the invention are shown in the PRIMAL 3362 column.

TABLE 1

| Plasticizer concentration | ACRONAL 3496 X % | PRIMAL 3362 % |
|---|---|---|
| 0% | Cannot be measured[1] | 40 |
| 1% | Cannot be measured[1] | 82 |
| 2% | Cannot be measured[1] | 87 |
| 3% | Cannot be measured[1] | 89 |
| 4% | Cannot be measured[1] | 92 |

[1]because of cohesive or adhesive faults.

Table 2 below shows the offset yield stress values (modulus at break and elongation at break).

TABLE 2

| Plasticizer content | PRIMAL 3362 | | ACRONAL 3496 X | |
|---|---|---|---|---|
| | $N/mm^2$ | (%) | $N/mm^2$ | (%) |
| 0% | 0.17 | 175 | / | / |
| 1% | 0.15 | 190 | / | / |
| 2% | 0.14 | 200 | / | / |
| 3% | / | / | 0.09 | 100 |
| 4% | 0.13 | 230 | 0.08 | 120 |

If the formulation according to the invention is compared with the Comparison Example, resilience amounts to more than 70% on the one hand against a non-measurable resilience on the other hand. Elongation at break is twice as high; modulus at break is increased by up to 50%.

What is claimed is:

1. A polyacrylate jointing compound comprised of:
   (a) 10% to 60% by weight of at least one copolymer containing from 85% to 98% by weight of constitutional units provided by at least one acrylate and from 2% to 10% by weight of constitutional units provided by acrylonitrile, wherein the acrylate is an ester of acrylic acid and an alcohol containing 2 to 8 carbon atoms;
   (b) 0.2% to 15% by weight of at least one fatty compound as a plasticizer selected from the group consisting of fatty acids, fatty alcohols and derivatives thereof and having a molecular weight between 300 and 1,500 and wherein said at least one fatty compound is not polyalkylene oxides and/or oleochemical derivatives of polyalkylene oxides;
   (c) 5% to 20 percent by weight of water;
   (d) up to 70% by weight of fillers and pigments; and
   (e) 0.3% to 5% by weight of one or more auxiliaries
wherein said polyacrylate jointing compound is in paste form; the percent by weight of the constitutional units of the copolymer being based on the weight of the copolymer and the percent by weight of components (a) through (e) being based on the weight of the jointing compound.

2. The polyacrylate jointing compound of claim 1 comprising 15% to 60% by weight of the jointing compound of component (a).

3. The polyacrylate jointing compound of claim 1 comprising 1% to 10% by weight of the jointing compound of component (b).

4. The polyacrylate jointing compound of claim 1 comprising 10% to 15% by weight of the jointing compound of water.

5. The polyacrylate jointing compound of claim 1 comprising at least one component selected from the group consisting of fillers and pigments in an amount of from 20% to 60% by weight of the jointing compound.

6. The polyacrylate jointing compound of claim 1 comprising 1% to 2.5% by weight of the jointing compound of said one or more auxiliaries.

7. The polyacrylate jointing compound of claim 1 comprising a copolymer of 90% to 98% by weight of constitutional units provided by acrylates and 2% to 8% by weight of constitutional units provided by acrylonitrile.

8. The polyacrylate jointing compound of claim 1 wherein said fatty compound is one or more fatty acid esters.

9. The polyacrylate jointing compound of claim 1 wherein said fatty compound is epoxystearic acid methyl ester.

10. The polyacrylate jointing compound of claim 1 wherein said fatty compounds are the only plasticizers present.

11. The polyacrylate jointing compound of claim 1 wherein said copolymer comprises constitutional units provided by butyl acrylate.

12. An improved method for joining a first substrate to a second substrate having a coefficient of thermal expansion or an elastic behavior which is different from that of the first substrate, the improvement comprising using the polyacrylate jointing compound of claim 1 to join the first substrate and the second substrate.

13. A polyacrylate jointing compound comprised of:
(a) 15% to 60% by weight of one or more copolymers comprising from 85% to 98% by weight of constitutional units provided by at least one acrylate and from 2% to 10% by weight of constitutional units provided by acrylonitrile, wherein the acrylate is an ester of acrylic acid and an alcohol containing 2 to 8 carbon atoms;
(b) 1% to 10% by weight of at least one fatty compound selected from the group consisting of fatty acids, fatty alcohols and derivatives thereof and having a molecular weight between 300 and 1,500 and wherein said at least one fatty compound is not polyalkylene oxides and/or oleochemical derivatives of polyalkylene oxides;
(c) one or more additional components selected from the group consisting of fillers and pigments, in an amount of from 20% to 60% by weight;
(d) 1% to 2.5% by weight of one or more auxiliaries; and
(e) 10% to 15% by weight of water;
wherein said polyacrylate jointing compound is in paste form; the percent by weight of the constitutional units of the copolymer being based on the weight of the copolymer and the percent by weight of components (a) through (e) being based on the weight of the jointing compound.

14. The polyacrylate jointing compound of claim 13 wherein (a) is at least one copolymer comprising 90% to 98% by weight of constitutional units provided by acrylate and 2% to 8% by weight of constitutional units provided by acrylonitrile.

15. The polyacrylate jointing compound of claim 13 wherein said fatty compound is one or more fatty acid esters.

16. The polyacrylate jointing compound of claim 13 wherein said fatty compounds are the only plasticizers present.

17. The polyacrylate jointing compound of claim 13 wherein said copolymer comprises constitutional units provided by butyl acrylate.

18. An improved method for joining a first substrate to a second substrate having a coefficient of thermal expansion or an elastic behavior which is different from that of the first substrate, the improvement comprising: using the polyacrylate jointing compound of claim 13 to join the first substrate and the second substrate.

19. A process for producing the polyacrylate jointing compound of claim 1 comprising:
1) forming a mixture of component (b) and component (a);
2) adding with mixing components (d) and (e) in any order; and
3) adjusting viscosity of the jointing compound, by addition of water.

20. The process of claim 19 wherein component (a) is in aqueous dispersion form.

* * * * *